United States Patent
Choi et al.

(10) Patent No.: US 9,350,589 B2
(45) Date of Patent: May 24, 2016

(54) MULTI IQ-PATH SYNCHRONIZATION

(71) Applicant: QUALCOMM Incorporated, San Diego, CA (US)

(72) Inventors: Kiyong Choi, San Jose, CA (US); Jeongsik Yang, San Jose, CA (US); Jin-Su Ko, San Jose, CA (US); Yi Zeng, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/465,768

(22) Filed: Aug. 21, 2014

(65) Prior Publication Data

US 2016/0056987 A1 Feb. 25, 2016

(51) Int. Cl.
*H04L 27/00* (2006.01)
*H04L 27/26* (2006.01)

(52) U.S. Cl.
CPC ........ *H04L 27/2662* (2013.01); *H04L 27/2627* (2013.01); *H04L 27/2649* (2013.01)

(58) Field of Classification Search
USPC ........................................... 455/73, 303, 118
See application file for complete search history.

(56) References Cited

U.S. PATENT DOCUMENTS

| | | | |
|---|---|---|---|
| 4,685,106 A * | 8/1987 | Miller et al. | H04J 3/1647 370/515 |
| 6,421,397 B1 | 7/2002 | McVey | |
| 7,003,049 B2 | 2/2006 | Hietala | |
| 8,085,893 B2 | 12/2011 | Werner | |
| 8,373,472 B2 | 2/2013 | Thaller et al. | |
| 2005/0107059 A1* | 5/2005 | Lehning et al. | H04L 27/00 455/303 |
| 2011/0255575 A1* | 10/2011 | Zhu et al. | 375/219 |
| 2011/0279147 A1 | 11/2011 | Montalvo et al. | |
| 2012/0027121 A1 | 2/2012 | Gerna et al. | |
| 2013/0315289 A1 | 11/2013 | Dominguez | |
| 2014/0098906 A1 | 4/2014 | Gudem et al. | |

OTHER PUBLICATIONS

International Search Report and Written Opinion—PCT/US2015/046073—ISA/EPO—Nov. 23, 2015.

\* cited by examiner

*Primary Examiner* — Chieh M Fan
*Assistant Examiner* — Wendel Cadeau
(74) *Attorney, Agent, or Firm* — Arent Fox LLP

(57) ABSTRACT

Aspects of a wireless apparatus and a method for handling a modulated signal include a frequency generator that produces a clock signal, a first synchronization circuit that generates a first sync enable signal based on an even edge of the clock signal, a second synchronization circuit that generates a second sync enable signal based on an even edge of the clock signal, a first divider having a first initial operating condition that generates a first IQ path based on the first sync enable signal, and a second divider having a second initial operating condition that generates a second IQ path based on the second sync enable signal, wherein the first and second operating conditions are not equal when initially powered.

16 Claims, 6 Drawing Sheets

MULTI IQ-PATH SYNCHRONIZATION

TECHNICAL FIELD

Various exemplary embodiments disclosed herein relate generally to electronic circuits. In particular, various embodiments relate to wireless devices that include multiple radio-frequency (RF) transceivers.

BACKGROUND

In wireless communications, multiple-input, multiple-output (MIMO) systems are used to increase the data rate. However, MIMO systems dissipate much more power than other wireless systems, as MIMO systems power multiple transmitters (TX) and receivers (RX) simultaneously. MIMO systems also add complexity, as electronic circuits in MIMO systems require additional components and control to handle the plurality of TX and RX chains.

Generally, a wireless device communicating through a MIMO system only uses one transmitter or receiver at a time, but will coordinate the transition between using different TX and RX components. A MIMO device may use various forms of clock synchronization to ensure that the multiple transmitters and receivers are coordinated with each other and work in tandem. Such synchronization between various TX and RX chains includes synchronization of I and Q component signals (the "IQ path") that are used by RF devices when employing some modulation techniques, such as quadrature phase-shift keying (QPSK). When generating each IQ path, a clock signal is sent to a timing circuit, one for each transmitter and receiver, which is used to help generate separate I and Q signals based on the frequency of the clock signal. The I and Q signals can be mixed with data bits and used in the modulation scheme to transmit data between devices in a wireless system.

However, the timing circuits that enable the multiple IQ paths have trouble maintaining synchronization with each other. For example, many components in timing circuits, such as frequency dividers used in the IQ-generation path, are flip-flops or similar discrete electronic components that include internal memory elements. For example, a flip-flop divider generates an output signal based on both a received clock signal at the divider's internal memory state. As a result, two dividers will only achieve time synchronization if they receive the same clock signal simultaneously while at the same initial memory state. However, if any flip-flop divider in the array of timing circuits receives a glitched clock signal or has a different internal memory state, the IQ path generated by the divider will no longer be synchronized with the others and may result in timing problems due to scaling of technology (e.g., race conditions).

In view of the foregoing, it would be desirable to synchronize multiple transmitters and receivers on the same wireless device. In particular, it would be desirable to effectively generate synchronized IQ paths for each transmitter and receiver on the wireless device.

SUMMARY

In light of the present need for improved IQ path synchronization in a wireless device, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Aspects of a method for handling a modulated signal for a wireless device includes receiving a clock signal, generating a first and second sync enable signal based on an even edge of the clock signal, generating, by a first divider having a first initial operating condition, a first IQ path based on the first sync enable signal, and generating, by a second divider having a second initial operating condition, a second IQ path based on the second enable signal, wherein the first and second operating conditions are not equal when initially powered.

Aspects of a wireless apparatus for handling a modulated signal include a frequency generator that produces a clock signal, a first synchronization circuit that generates a first sync enable signal based on an even edge of the clock signal, a second synchronization circuit that generates a second sync enable signal based on an even edge of the clock signal, a first divider having a first initial operating condition that generates a first IQ path based on the first sync enable signal, and a second divider having a second initial operating condition that generates a second IQ path based on the second sync enable signal, wherein the first and second operating conditions are not equal when initially powered.

It is understood that other aspects of apparatus, circuits, and methods will become readily apparent to those skilled in the art from the following detailed description, wherein various aspects of apparatus, circuits, and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

It should be apparent that, in this manner, various exemplary embodiments enable an improved wireless device. Particularly, by adding a circuit that provides sync enable signals for each flip-flop divider, the MIMO wireless device can generate synchronized IQ paths while ignoring inherent glitches or initial operating conditions of individual components.

BRIEF DESCRIPTION OF THE DRAWINGS

In order to better understand various exemplary embodiments, reference is made to the accompanying drawings wherein.

DETAILED DESCRIPTION

Figure 1:
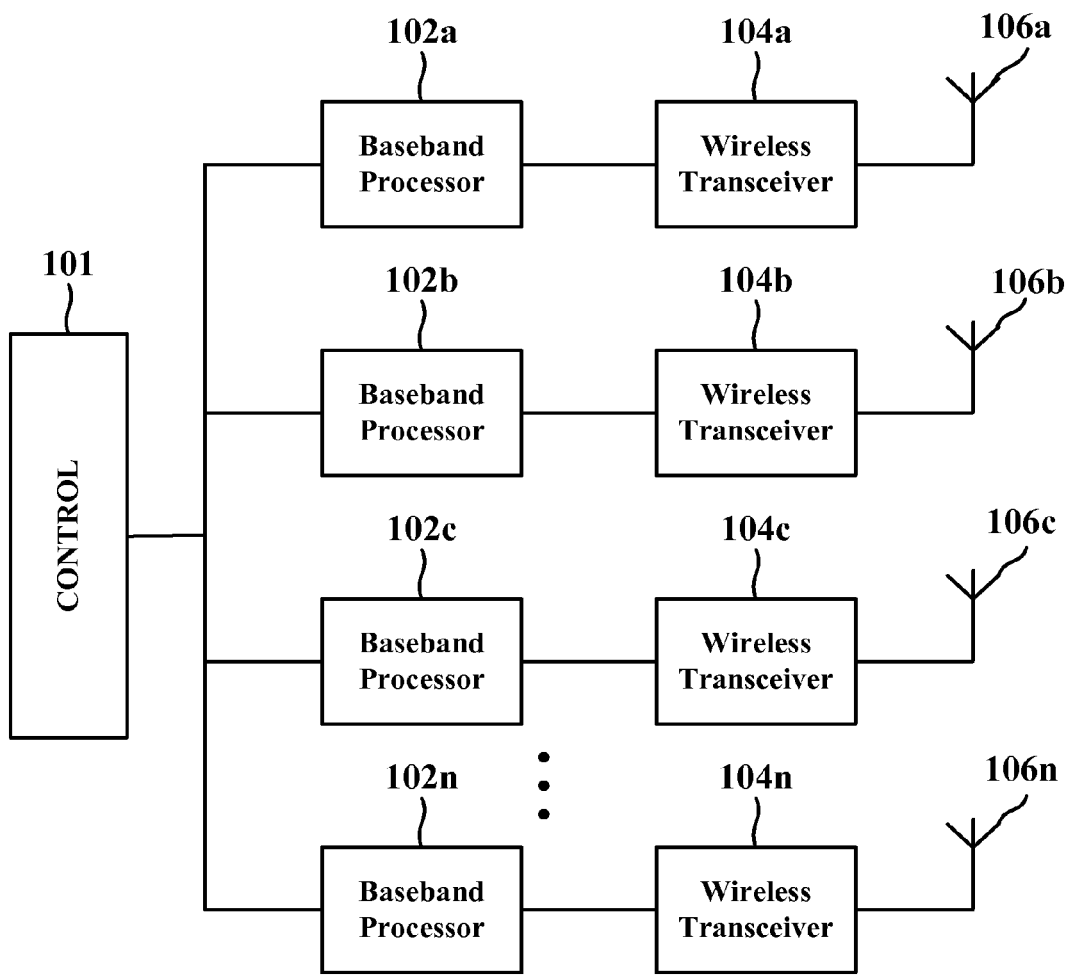
FIG. 1 illustrates an exemplary wireless device with multiple transmitter and receiver paths.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus, circuit or method does not require that all embodiments of the invention include the described components, structure, features, functionality, processes, advantages, benefits, or modes of operation.

The terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As used herein, two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the terms "comprises", "comprising,", "includes" and/or "including", when used herein, specify the presence of the stated features, integers, steps, operations, elements, and/or components, but do not preclude the presence or addition of one or more other features, integers, steps, operations, elements, components, and/or groups thereof.

Various aspects of circuits for synchronizing a plurality of transmitters and/or receivers will now be presented. However, as those skilled in the art will readily appreciate, such aspects may be extended to other circuit configurations and devices. Accordingly, all references to a specific application for time synchronization circuits, or any component, structure, feature, functionality, or process within a synchronized wireless device are intended only to illustrate exemplary aspects of a wireless device with the understanding that such aspects may have a wide differential of applications.

Various embodiments of a synchronized wireless device may be used, such as a mobile phone, personal digital assistant (PDA), desktop computer, laptop computer, palm-sized computer, tablet computer, set-top box, navigation device, work station, game console, media player, or any other suitable device.

FIG. 1 is a conceptual block diagram illustrating an exemplary embodiment of such a wireless device. The wireless device 100 may be configured to support any suitable multiple access technology, including by way of example, Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access technologies. The wireless device 100 may be further configured to support any suitable air interface standard, including by way of example, Long Term Evolution (LTE), Evolution-Data Optimized (EV-DO), Ultra Mobile Broadband (UMB), Universal Terrestrial Radio Access (UTRA), Global System for Mobile Communications (GSM), Evolved UTRA (E-UTRA), IEEE 802.11 (Wi-Fi), IEEE 802.16 (WiMAX), IEEE 802.20, Flash-OFDM, Bluetooth, or any other suitable air interface standard. The actual air interface standard and the multiple access technology supported by the wireless device 100 will depend on the specific application and the overall design constraints imposed on the system.

FIG. 1 illustrates an exemplary wireless device with multiple transmitter and receiver paths. The wireless device 100 includes a control circuit 101, baseband processors 102$a$-$n$, wireless transceivers 104$a$-$n$, and antennas 106$a$-$n$. Control circuit 101 can coordinate with the plurality of baseband processors 102$a$-$n$ to synchronize the plurality of transceiver paths with a single clock signal to enable communications for wireless device 100 while using multiple antennas.

Control circuit 101 can control each of N (where N≥2) transceiver paths (e.g., baseband processor 102, wireless transceiver 104, and antenna 106) included in wireless device 100. For example, in the illustrative embodiment, control circuit 101 controls each of the four transceiver paths ending with antennas 106$a$-$n$. In other embodiments, control circuit 101 can be connected to more or less transceivers 104$a$-$n$, or more or less transmitter/receiver (TX/RX) paths. In some embodiments, control circuit 101 can coordinate use of one or more TX/RX paths by sending control signals to each baseband processor 102$a$-$n$. In some embodiments, as will be discussed in relation to FIG. 3, the control signals include enable signals to specific components within timing circuits of baseband processor 102$a$-$n$. In some embodiments, control circuit 101 can include a clock, such as an oscillator that produces a clock signal that is sent to each TX/RX path.

Baseband processors 102$a$-$n$ provide the basic protocol stack required to support wireless communications for each transceiver 104$a$-$n$, including, for example, a physical layer for transmitting and receiving data in accordance with the physical and electrical interface to the wireless channel, a data link layer for managing access to the wireless channel, a network layer for managing source to destination data transfer, a transport layer for managing transparent transfer of data between end users, and any other layers necessary or desirable for establishing or supporting a connection to a network through the wireless channel.

In some embodiments, baseband processors 102$a$-$n$ include timing circuits that produce I and Q signals that are received as inputs by components in transceivers 104$a$-$n$. In some embodiments, each baseband processor 102$a$-$n$ can include a synchronization circuit that generates a synchronization enable (SYNC ENABLE) signal that is used by the timing circuit to generate the I and Q signals as the IQ path. In some embodiments, one or more components in baseband processors 102$a$-$n$ can be powered down when the specific TX/RX path is not in use.

Each wireless transceiver 104$a$-$n$ performs transmitting functions by modulating one or more carrier signals with data generated by corresponding baseband processor 102a-n for transmission over a wireless channel through corresponding antenna 106a-n. Each wireless transceiver 104a-n performs receiving functions by demodulating one or more carrier signals received from the wireless channel through corresponding antenna 106a-n to recover data for further processing by corresponding baseband processor 102a-n.

Antennas 106a-n can send or receive signals over a wireless channel. The use of one of antennas 106a-n depends on the active TX/RX path. For example, when a path for transceiver 104b is active, the antenna can transmit a modulated signal or receive a modulated signal. In some embodiments, multiple antennas 106a-n can be active simultaneously and can communicate over the wireless channel simultaneously. For example, antennas 106a and 106b can be active when wireless device 100 is communicating through the wireless channel using carrier aggregation.

Figure 2:
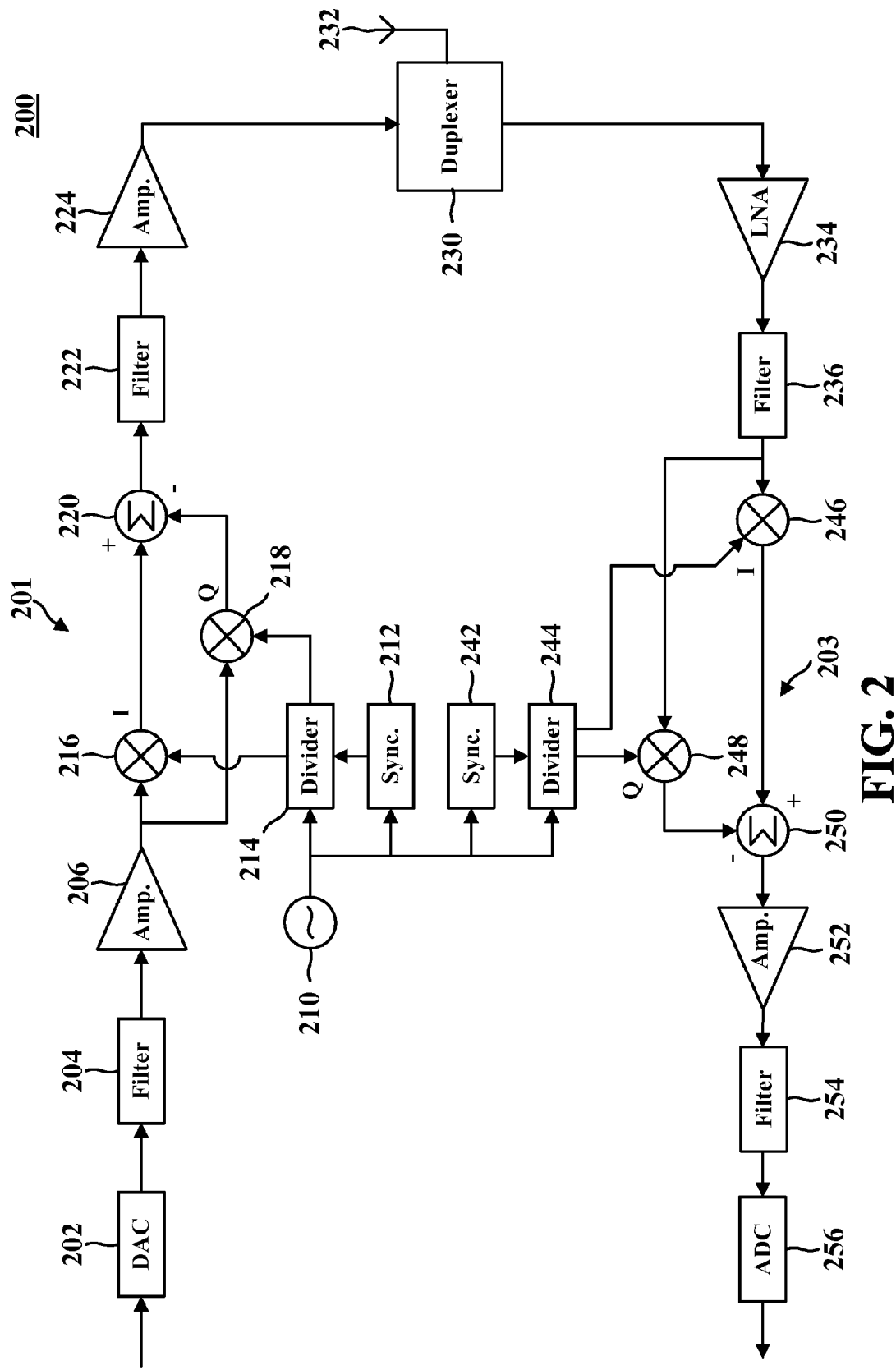
FIG. 2 illustrates an exemplary wireless transceiver employing IQ paths.

FIG. 2 illustrates an exemplary wireless transceiver employing IQ paths. Wireless transceiver 200 can include a transmitter (TX) path 201 and/or a receiver (RX) path 203 that together support bi-directional communication via antenna 232. Each TX/RX path can be synchronized from a common clock 210.

Each of transmitter (TX) path 201 and/or receiver (RX) path 203 can be implemented using super-heterodyne circuit architecture or direct-conversion circuit architecture. In the super-heterodyne architecture, a signal is frequency converted between RF and baseband in multiple stages (e.g., from RF to an intermediate frequency (IF) in one stage, and then from IF to baseband in another stage for a receiver). In the direct-conversion architecture, which is also referred to as a "zero-IF" architecture, a signal is frequency converted between RF and baseband in one stage. In some embodiments, a super-heterodyne or direct-conversion architecture may use different circuit blocks and/or have different requirements for wireless transceiver 200. The illustrative embodiment shown in FIG. 2 has transmitter path 201 and receiver path 203 implemented with direct-conversion architectures.

In the transmit path, baseband processor 104 (see FIG. 1) provides data to a digital-to-analog converter (DAC) 202. DAC 202 converts a digital input signal to an analog output signal. The analog output signal is provided to filter 204, which filters the analog output signal to remove images caused by the prior digital-to-analog conversion by DAC 202. Amplifier 206 is used to amplify the signal from filter 204 to provide an amplified baseband signal. Mixers 216, 218 receive the amplified baseband signal and respective I and Q signals from clock divider 214. Mixers 216, 218 mix the amplified baseband signal with the I and Q signals to provide an up-converted signal. Combiner 220 combines the mixed I and Q signals output respectively from mixers 216, 218 to produce a combined signal. Filter 222 is used to filter the up-converted, combined signal to remove images caused by the frequency mixing and combining. Power amplifier (also referred to as PA or Amp) 224 is used to amplify the signal from filter 222 to obtain an output RF signal at the desired output power level. The output RF signal is routed through a duplexer 230 to the antenna 232 for transmission over the wireless channel.

In the receive path, antenna 232 may receive signals transmitted by a remote device. The received RF signal may be routed through duplexer 230 to receiver path 203. Within receiver path 203, the received RF signal is amplified by low-noise amplifier (LNA) 234 and filtered by filter 236 to obtain an input RF signal. Mixers 246, 248 receive the input RF signal and I and Q signals from clock divider 244. Mixers 246, 248 mix the input RF signal with the respective I and Q signals to provide a down-converted signal. The down-converted signal is combined by combiner 250 and amplified by amplifier 252 to obtain an amplified down-converted signal from the down-converted combined signal. Filter 254 is used to filter the amplified down-converted signal to remove images caused by the frequency mixing. The signal from filter 254 is provided to an analog-to-digital converter (ADC) 256. ADC 256 converts the signal to a digital output signal. The digital output signal may be provided to the baseband processor 102 (see FIG. 1).

TX path 201 and RX path 203 can be synchronized to a common clock signal. Clock 210 can be an oscillator, such as a voltage-controlled oscillator (VCO) that generates the clock signal that is sent to each of TX path 201 and RX path 203. Clock 210 generates and transmits the clock signals to each synchronization circuit 212, 242 and clock divider 214, 244. As will be discussed in relation to FIG. 3, each synchronization circuit 212, 242 receives the clock signal and generates a SYNC ENABLE signal for clock divider 214, 244 to generate respective I and Q component signals for mixers, 216, 246, 218, 248.

The conditioning of the signals in TX path 201 and RX path 203 can be performed by one or more stages of amplifiers, filters, mixers, etc. These circuits can be arranged differently from the configuration shown in FIG. 2. Furthermore, other circuits not shown in FIG. 2 can also be used to condition the signals in TX path 201 and RX path 203. For example, impedance-matching circuits can be located at the output of PA 224, at the input of LNA 234, between antenna 232 and duplexer 230, etc.

Figure 3:
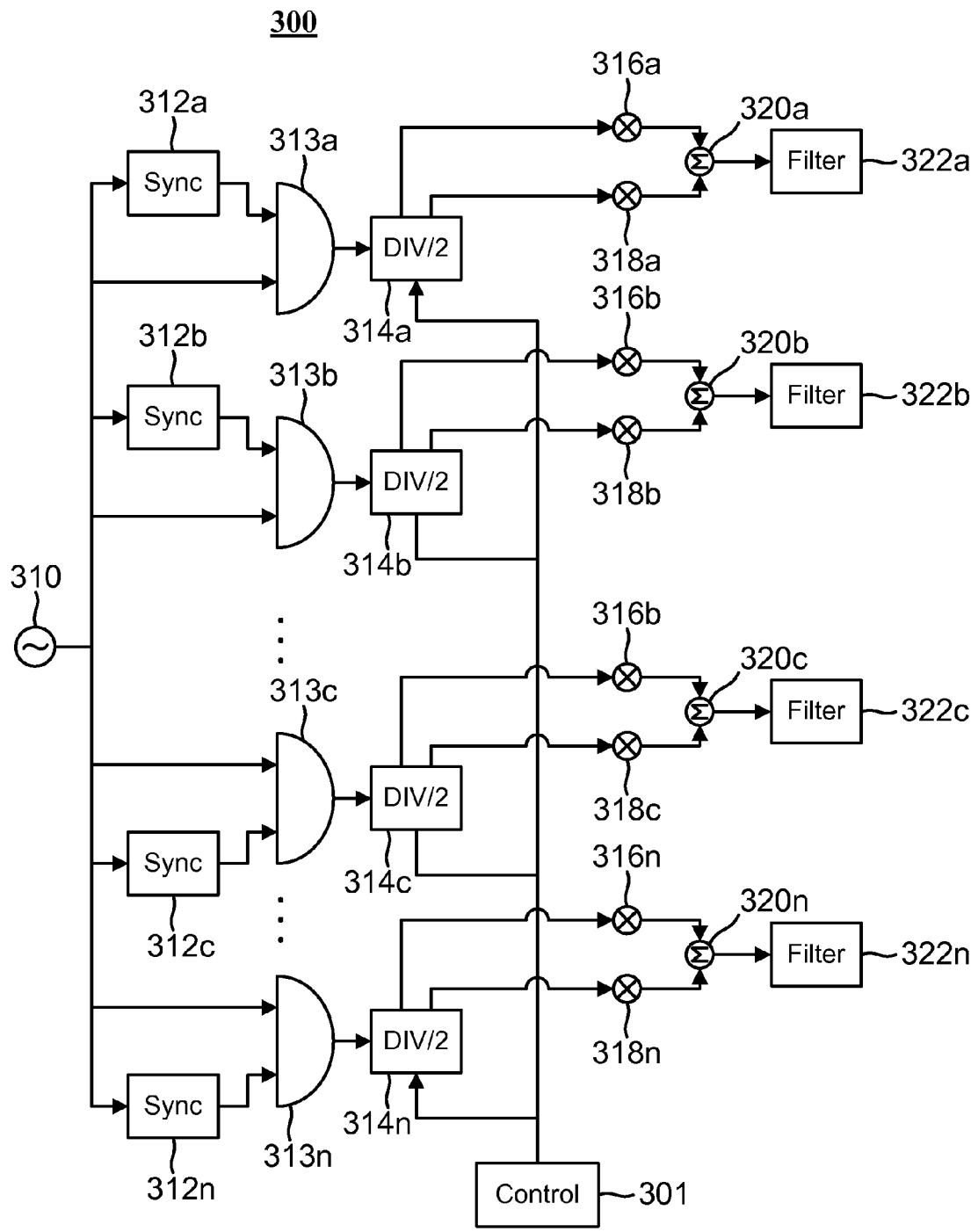
FIG. 3 illustrates exemplary timing circuits for multiple transmitter and/or receiver paths.

FIG. 3 illustrates exemplary timing circuits for multiple transmitter and/or receiver paths. Wireless device 100 can use timing circuit array 300 to synchronize multiple powered TX/RX paths to a single clock signal. Timing circuit array 300 includes a control circuit 301, a clock generator 310, and N paths. Each of N paths includes a synchronization (sync) circuit 312a-n, a logic gate 313a-n, a divider 314a-n, mixers 316a-n, 318a-n, a combiner 320a-n, and a filter 322a-n. In some embodiments, some of the TX/RX paths are not powered while some of the other TX/RX paths are in use.

Clock generator 310 can be a frequency oscillator, such as an electric oscillator (e.g., crystal oscillator) or voltage-controlled oscillator (VCO) that generates a clock signal for wireless device 100. The clock signal generated by clock generator 310 can be, for example, a square wave or a sine wave, oscillating at a high frequency (e.g., 100 GHz) that is later lowered to specific frequencies by other components in a timing circuit path, such as logic dividers 314a-n. Clock generator 310 can be a common clock for each component in wireless device 100 and generates a clock signal that is sent to each of N paths in timing circuit array 300. Synchronization circuits 312a-n and digital logic gates 313a-n can be arranged close to clock generators 310 to minimize physical distance between components and minimize the length of the clock distribution network ("clock tree") that connects clock generator 310 to these other components.

Control circuit 301 can be a discrete electronic component or section of an electronic circuit that controls elements of each of N timing paths. Control circuit 301 can send enable and reset signals to components like synchronization circuits 312a-n and logic gates 313a-n to synchronize the output signals sent to each TX/RX path. In some embodiments, control circuit 301 can also control the power up and power down of specific electronic components during operation. For example, when wireless device 100 includes four TX/RX paths, control circuit 301 can ensure logic divider 314a is powered while powering off logic dividers 314b-n when not in use.

Synchronization circuits 312a-n can include digital logic to generate a SYNC ENABLE signal based at least on a clock signal received from clock generator 310. As will be discussed in relation to FIG. 4, each synchronization circuit 312a-n receives the clock signal and an enable signal (not shown) from control circuit 301 and generates a SYNC ENABLE circuit that is used in the timing path to ensure a specific TX/RX path is synchronized to the clock signal. Digital logic gates 313a-n receive the clock signal from clock generator 310 and SYNC ENABLE signals from synchronization circuit 312a-n and output signals to logic dividers 314a-n. In the illustrative embodiment, logic gates 313a-n are AND gates that only output non-zero signals to logic dividers 314a-n when the clock signal and the SYNC ENABLE signal are received.

Logic dividers 314a-n can be one or more digital electronic components that convert the received clock signal to a different frequency. Dividers 314a-n can be, for example, one or more logic circuits configured to perform dividing functions. In the illustrative embodiment, for example, each logic divider 314a-n is a binary divider ("divide-by-two") including a D-type, edge-triggered flip-flop and an inverter connected in series configured to output a signal with twice the period of an input signal. In some embodiments, each of N logic dividers 314a-n can divide the clock signal input by a different denomination such that the output signals have different periods. In some embodiments, each logic divider 314a-n can output multiple output signals based on the input clock signal. For example, logic dividers 314a-n of the illustrative embodiment generate and transmit I and Q signals based on the input clock signal. As will be discussed in relation to FIG. 5, the I an Q signals generated by each logic divider 314a-n of the illustrative embodiment have the same period and magnitude, but the Q signal is out of phase by $\pi/2$ relative to the I signal.

In some embodiments, logic dividers 314a-n can have differing initial operating conditions. When logic dividers 314a-n have differing operating condition, two logic dividers 314a, b that receive the same input signal would produce output signals at different phases relative to each other. In the illustrative embodiment, for example, logic circuits 314a-n can receive input signals from AND gates 313a-n and a control signal from control circuit 301 to produce output signals. Over time, any phase differences due to differing initial operating conditions of logic dividers 314a-n can be reduced until logic dividers 314a-n produce synchronized output signals.

Mixers 316a-n, 318a-n receive the I and Q signals transmitted from logic dividers 314a-n and the signal from either amplifier 206 or filter 236. When part of a TX path, as in the illustrative embodiment, mixers 316a-n, 318a-n generate I and Q component signals that sent to combiners 320a-n. Combiners 320a-n combine the I and Q component outputs from mixers 316a-n, 318a-n by subtracting the Q component signal from the I component signal and send the signal to filter 322 before it is sent to antenna 232 for transmission. When part of an RX path, mixers 316a-n, 318a-n receive the clock signal and the modulated signal from filter 236 and output I and Q component outputs to combiners 320a-n, which output the combined signal to filter 322a-n.

Figure 4:
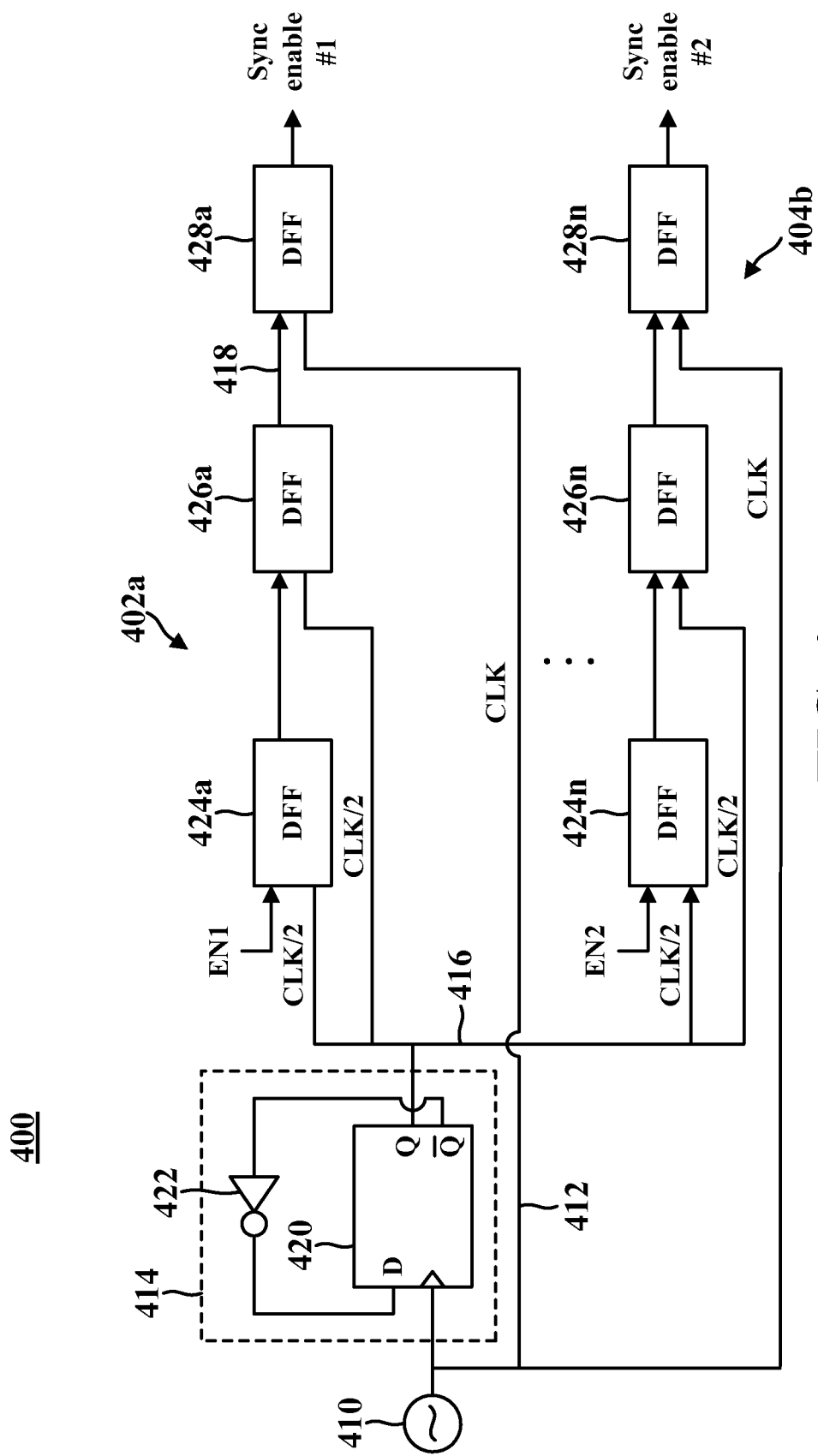
FIG. 4 illustrates exemplary synchronization circuits for multiple timing paths.

FIG. 4 illustrates exemplary synchronization circuits for multiple timing paths. Synchronization circuit array 400 can be used, for example, in multiple timing paths for timing circuits that are components of TX/RX paths in order to synchronize each TX/RX path with the device's clock signal. Synchronization circuit array 400 can include multiple synchronization circuits 402a-n, a clock generator 410, and a binary divider 414 that includes an edge-triggered D-type flip-flop (DFF) 420 and an inverter 422 connected to the input and output of DFF 420 to generate a feedback loop. Binary divider 414 can generate a divided clock signal after receiving the clock signal from clock generator 410 for one period.

Each synchronization circuit 402a-n can generate a SYNC ENABLE signal based on clock signal (CLK) 412, the divided clock signal (CLK/2) 416, and an enable signal (EN1, EN2, etc.) received from control circuit 301. In some embodiments, each synchronization circuit 402a-n can be arranged in close physical proximity on the circuit chip to clock generator 410 to minimize the size of the clock tree transmitting clock signal 412 to multiple components. The physical arrangement of synchronization circuits 402a-n can also minimize errors in the signal path of clock signal 412 and divided clock signal 416.

As will be discussed in relation to FIG. 5, each synchronization circuit 402a-n includes three edge-triggered D-type flip-flops (DFFs) 424a-n, 426a-n, 428a-n. The DFFs are connected such that the output of DFF 428a-n generates a SYNC ENABLE signal that allows digital logic gates 313a-n to send clock signal 412 to each logic divider 314a-n. The generated SYNC ENABLE signals can therefore synchronize the outputs of logic dividers 314a-n without knowing the initial memory condition of any individual logic divider 314a-n or any glitch from the output of clock generator 410.

For example, in synchronization circuit 402a, DFF 424a receives CLK/2 signal 416 from binary divider 414 and the EN1 enable signal from control circuit 301 as inputs. DFF 424a outputs a signal to DFF 426a, which also receives CLK/2 signal 416 as an input. Upon receiving those inputs, DFF 426a generates a sync input signal 418 that is transmitted to DFF 428a. DFF 428a receives CLK signal 412 and sync input signal 418 to generate the SYNC ENABLE that is sent to digital logic gate 313a.

Figure 5:
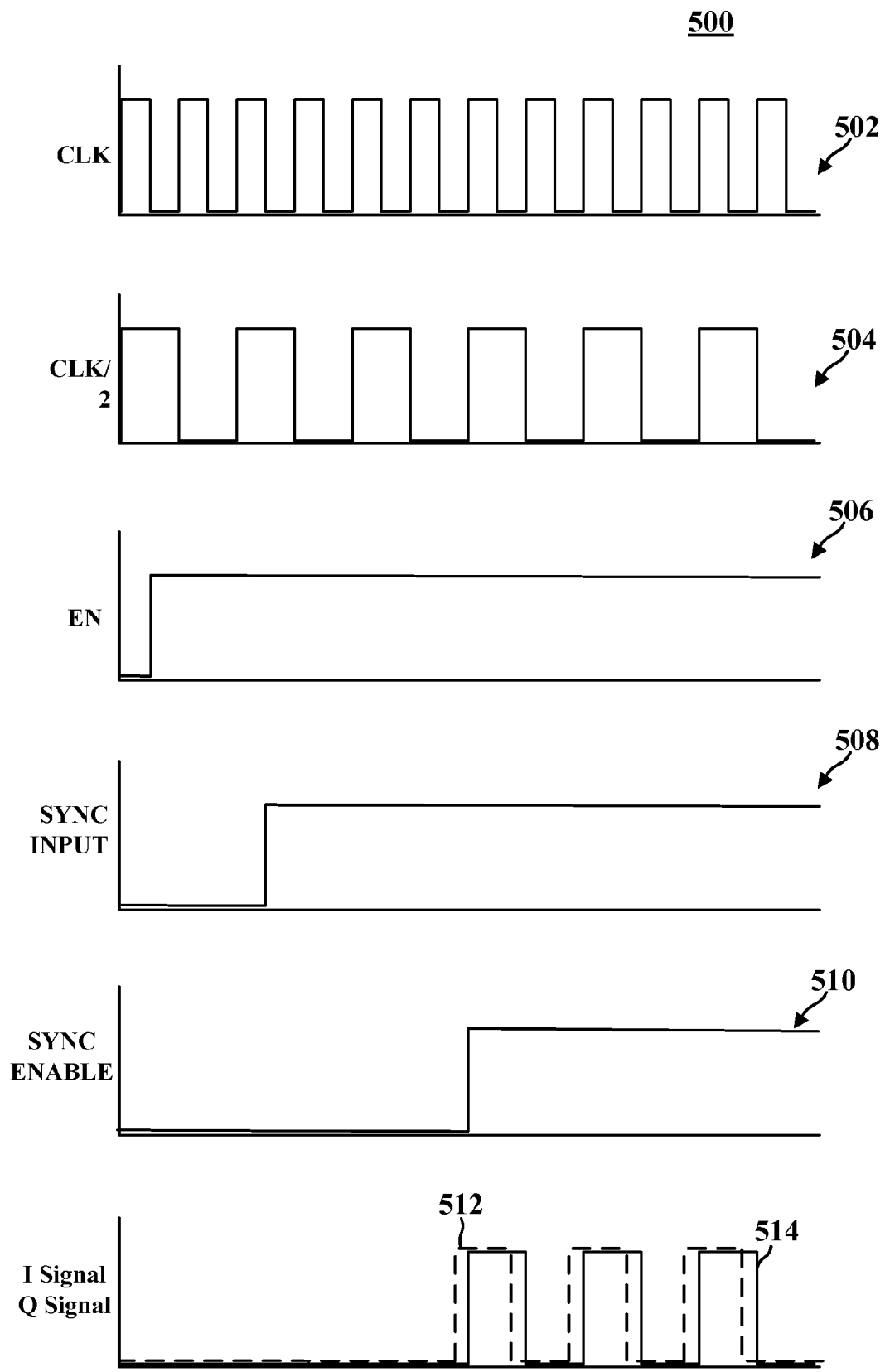
FIG. 5 illustrates timing diagrams for components in an exemplary synchronization circuit.

FIG. 5 illustrates timing diagrams for components in an exemplary synchronization circuit. Timing diagram 500 includes waveforms for signals generated by various components included in timing circuit array 300 and synchronization circuit array 400.

Diagram 502 illustrates the waveform of clock (CLK) signal 412. In some embodiments, CLK signal 412 has a high frequency that is lowered by other components to transmit timing signals at other desired, lower frequencies. In the illustrative embodiment, CLK signal 412 is a square wave. In other embodiments, clock generator 410 can output CLK signal 412 in another wave form, such as a sine wave. In some instances, clock generator 410 can output a CLK signal that includes glitches (not shown), such as a shortened period or multiple peaks within a given period. The clock glitch can be an inherent property of the oscillator generating the CLK waveform. In such instances, the glitch occurs very early in the generation of CLK signal 412 and corrects itself after a few initial periods.

Diagram 504 illustrates the waveform of CLK/2 signal 416. Binary divider 414 generates CLK/2 signal based on CLK signal 412 received from clock generator 410. In some embodiments, the CLK/2 signal is phase shifted by $\pi$, such as when DFF 420 of binary divider 414 triggers from the falling edge of CLK waveform 502. In the illustrative embodiment, DFF 420 triggers from the rising edge of CLK waveform 502 and is synchronized such that CLK waveform 502 and CLK/2 waveform 504 always rise simultaneously.

Diagram 506 illustrates the waveform of EN signal from control circuit 301. Control circuit 301 can send enable signals to synchronization circuits 312a-n, 402a-n and logic dividers 314a-n to enable timing circuits for a specific TX/RX path. Synchronization circuit 312a can wait to receive EN waveform 506 before generating the SYNC ENABLE signal. Logic divider 314a can wait to receive EN waveform 506 before generating the IQ path as I and Q signals for mixers 316a, 318a.

In some embodiments, control circuit 301 does not send EN waveform 502 to the synchronization circuit 312a or logic divider 314a for a particular TX/RX path until that path is to be used for communication. In such instances, some components in the TX/RX path, such as logic divider 314a, can be powered off until the control circuit 301 powers the components when the TX/RX path is going to be used by wireless device 100.

Diagram 508 illustrates the waveform of sync input signal 418. Diagram 510 illustrates the waveform of the SYNC ENABLE signal. In the illustrative embodiment, DFF 426a generates sync input waveform 508 after being triggered from the even edge of CLK/2 waveform 504 and receiving the output from DFF 424a. Similarly, DFF 428a generates SYNC ENABLE waveform 510 after being triggered from the even edge of CLK waveform 502 and sync input waveform 508.

Diagrams 512, 514 illustrate the waveforms of the I and Q signals of the IQ path. Logic divider 314a can generate the I signal 512 and Q signal 514 upon receipt of the CLK waveform 502 and EN waveform 506. Q signal 514 is $\pi/2$ out of phase from I signal 512. Due to synchronization circuit 312a and digital logic gate 313a, logic divider 314a can only generate IQ path 512, 514 after SYNC ENABLE waveform 510 is generated.

Figure 6:
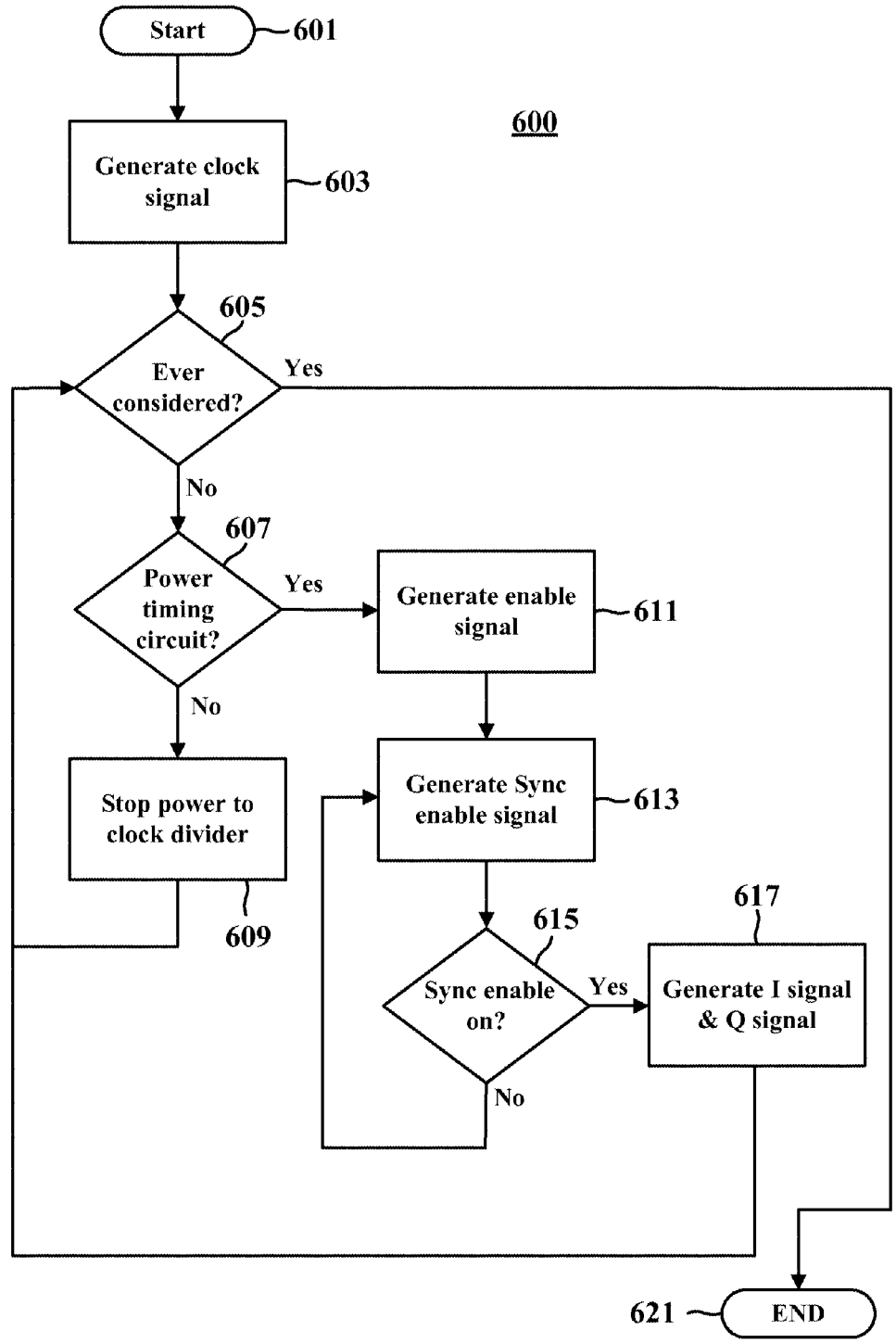
FIG. 6 illustrates an exemplary method for generating synchronized IQ paths for a plurality of transmitter and/or receiver paths in a wireless device.

FIG. 6 illustrates an exemplary method for generating synchronized IQ paths for a plurality of transmitter and/or receiver paths in a wireless device. Control circuit 101, 301 can employ method 600 when controlling one or more TX/RX paths in a wireless device.

Method 600 can start at step 601 and proceed to step 603, where clock generator 301 generates a clock signal. In step 605, control circuit 301 determines whether it has made a decision, for each available TX/RX path, on whether to power components for that path. If so, the method ends at step 621. Otherwise, for each TX/RX path, control circuit 301 can in step 607 determine whether to power the TX/RX path. Control circuit 301 can decide to power a TX/RX path if it determines that the TX/RX path is to go into use or currently is in use. Conversely, control circuit 301 can decide to power off a TX/RX path if it is not in use without adversely affecting synchronization, as synchronization circuits 312a-n enable each TX/RX path to be synchronized with the clock signal once it is powered up. When control circuit 301 determines to power down a specific TX/RX path, it proceeds to step 609, where it powers down specific components of the TX/RX path, such as logic dividers 314a-n. Once the specific TX/RX path is powered down, control circuit 301 returns to step 605.

When control circuit 301 determines to power on a particular TX/RX path, control circuit proceeds to step 611, where control circuit 301 powers the TX/RX path and generates enable and reset signals for components to the powered TX/RX path. In some embodiments, control circuit 301 can use the generated reset signal to power on specific components in the TX/RX paths that were powered off.

In step 613, synchronization circuit 312a in the powered TX/RX path generates a SYNC ENABLE signal based on the clock signal. In some embodiments, synchronization circuit 312a only transmits the SYNC ENABLE signal when it receives the clock signal and the enable signal from control circuit 301. In step 615, logic divider 314a determines whether the SYNC ENABLE signal has been generated. In some embodiments, logic divider 314a determines that the SYNC ENABLE signal was generated when it receives a non-zero signal from digital logic gate 314a. If logic divider 314a determines that the SYNC ENABLE signal has not yet been generated, it returns to step 613. Otherwise, logic divider 314a proceeds to step 617, where it generates the IQ path as separate I and Q signals for use by mixers in the TX/RX path. Once the IQ path is generated, control circuit 301 returns to step 605 and continues on a loop of checking each TX/RX path until they are all considered. Once each path is considered, control circuit proceeds to step 621 to end the method.

The specific order or hierarchy of blocks in the method of operation described above is provided merely as an example. Based upon design preferences, the specific order or hierarchy of blocks in the method of operation may be re-arranged, amended, and/or modified. The accompanying method claims include various limitations related to a method of operation, but the recited limitations are not meant to be limited in any way by the specific order or hierarchy unless expressly stated in the claims.

The previous description is provided to enable any person skilled in the art to fully understand the full scope of the disclosure. Modifications to the various exemplary embodiments disclosed herein will be readily apparent to those skilled in the art. Thus, the claims should not be limited to the various aspects of the disclosure described herein, but shall be accorded the full scope consistent with the language of claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

We claim:

1. A method for handling a modulated signal for a wireless device, the method comprising:
   receiving a clock signal;
   generating a first sync enable signal and a second sync enable signal based on an even edge of the clock signal, wherein the generating of the first sync enable signal comprise:
   generating, by a first D Flip-Flop (DFF), a divided clock signal based on the clock signal;
   generating, by a second DFF, a first output signal based on the divided clock signal from the first DFF;
   generating, by a third DFF, a second output signal based on the divided clock signal and the first output signal from the second DFF; and
   generating, by a fourth DFF, the first sync enable signal based on the clock signal and the second output signal from the third DFF;
   generating, by a first divider having a first initial operating condition, a first IQ path comprising a first I component signal and a first Q component signal based on the first sync enable signal;
   receiving, by the first divider from a control circuit, a first enable signal, wherein the first divider only generates the first IQ path when it receives the first enable signal and the first sync enable signal;

powering the first divider after receiving the first sync enable signal;

generating, by a second divider having a second initial operating condition, a second IQ path comprising a second I component signal and a second Q component signal based on the second sync enable signal, wherein the first and second operating conditions are not equal when initially powered;

receiving, by the second divider from a control circuit, a second enable signal, wherein the second divider only generates the second IQ path when it receives the second enable signal and the second sync enable signal; and powering the second divider after receiving the second sync enable signal.

2. The method of claim 1, wherein the control circuit generates a control signal to power the first or second divider.

3. The method of claim 1, wherein the first output signal is generated further based on the first enable signal.

4. The method of claim 1, further comprising:
modulating, by a first transmitter, a first data signal using the first IQ path; and
modulating, by a second transmitter, a second data signal using the second IQ path.

5. The method of claim 1, further comprising:
modulating, by a transmitter, a first data signal using the first IQ path; and
demodulating, by a receiver, a second data signal using the second IQ path.

6. The method of claim 1, further comprising:
generating, for each of a plurality of dividers, a sync enable signal based on an even edge of the clock signal, wherein each of the plurality of dividers have an initial operating condition; and
generating, by each of the plurality of dividers, an IQ path based on the sync enable signal generated for the divider, wherein the initial operating condition of the plurality of dividers are not all equal.

7. The method of claim 1, wherein the first divider comprises a binary divider circuit comprising at least one edge-triggered D flip-flop, and further wherein the second divider comprises a binary divider circuit comprising at least one edge-triggered D flip-flop.

8. The method of claim 4, further comprising:
transmitting, by a first antenna, the modulated first data signal received from the first transmitter; and
transmitting, by a second antenna, the modulated second data signal received from the second transmitter.

9. A wireless apparatus for handling a modulated signal, the apparatus comprising:
a frequency generator that produces a clock signal;
a first synchronization circuit that generates a first sync enable signal based on an even edge of the clock signal, the first synchronization circuit comprising:
a first D Flip-Flop (DFF) that receives the clock signal and generates a divided clock signal;
a second DFF that receives the divided clock signal and generates a first output signal;
a third DFF that receives the divided clock signal and the first output signal and generates a second output signal; and
a fourth DFF that receives the clock signal and the second output signal and generates the first sync enable signal;
a second synchronization circuit that generates a second sync enable signal based on an even edge of the clock signal;
a first divider having a first initial operating condition that generates a first IQ path comprising a first I component signal and a first Q component signal based on the first sync enable signal;
a second divider having a second initial operating condition that generates a second IQ path comprising a second I component signal and a second Q component signal based on the second sync enable signal, wherein the first and second operating conditions are not equal when initially powered; and
a control circuit that generates a first enable signal for the first divider and a second enable signal for the second divider, wherein the first divider only generates the first IQ path when it receives the first enable signal and the first sync enable signal, wherein the second divider only generates the second IQ path when it receives the second enable signal and the second sync enable signal, wherein the first divider is powered after receiving the first sync enable signal and the second divider is powered after receiving the second sync enable signal.

10. The apparatus of claim 9, wherein the control circuit generates a control signal to power the first or second divider.

11. The apparatus of claim 9, wherein the second DFF further receives the first enable signal to generate the first output signal.

12. The apparatus of claim 9, further comprising:
a first transmitter that modulates a first data signal using the first IQ path; and
a second transmitter that modulates a second data signal using the second IQ path.

13. The apparatus of claim 9, further comprising:
a transmitter that modulates a first data signal using the first IQ path; and
a receiver that demodulates a second data signal using the second IQ path.

14. The apparatus of claim 9, further comprising:
a plurality of dividers, each of the plurality of dividers having an initial operating condition; and
a plurality of synchronization circuits, each of the plurality of synchronization circuits generating a sync enable signal based on an even edge of the clock signal,
wherein each of the plurality of dividers generates an IQ path based on the sync enable signal generated for the divider, and further wherein for the initial operating conditions of the plurality of dividers are not all equal.

15. The apparatus of claim 9, wherein the first divider comprises a binary divider circuit comprising at least one edge-triggered D flip-flop, and further wherein the second divider comprises a binary divider circuit comprising at least one edge-triggered D flip-flop.

16. The apparatus of claim 12, further comprising:
a first antenna that transmits the modulated first data signal received from the first transmitter; and
a second antenna that transmits the modulated second data signal received from the second transmitter.

* * * * *